United States Patent
Lundberg et al.

[11] Patent Number: 5,930,334
[45] Date of Patent: Jul. 27, 1999

[54] METHOD AND APPARATUS FOR MONITORING THE OPERATION OF TELECOMMUNICATIONS EQUIPMENT

[75] Inventors: Richard Lundberg; Håkan Omnell, both of Umeå; Tomas Kostenius, Hässleholm; Gunnar Hällgren, Huddinge, all of Sweden

[73] Assignee: Telefonaktiebolaget LM Ericsson, Stockholm, Sweden

[21] Appl. No.: 08/828,936

[22] Filed: Mar. 28, 1997

[51] Int. Cl.⁶ .............................. H04M 1/24; H04M 3/08; H04M 3/22
[52] U.S. Cl. .................................. 379/27; 379/1; 379/8; 379/12; 379/16; 370/248; 370/251
[58] Field of Search .................. 379/1, 2, 8, 9, 379/10, 15, 16, 27, 32, 34, 133, 134, 137, 138, 184, 194, 189, 12; 370/247, 248, 250, 251, 252

[56] References Cited

U.S. PATENT DOCUMENTS

| | | |
|---|---|---|
| 4,197,427 | 4/1980 | Hutcheson et al. . |
| 4,306,295 | 12/1981 | Caroc ....................................... 364/761 |
| 4,330,688 | 5/1982 | Tiribelli . |
| 4,464,543 | 8/1984 | Kline et al. ................................ 379/10 |
| 5,042,027 | 8/1991 | Takase et al. ............................ 379/133 |
| 5,425,087 | 6/1995 | Gerber et al. ............................ 379/134 |
| 5,471,526 | 11/1995 | Linnermark et al. .................... 379/268 |
| 5,479,473 | 12/1995 | Zey ............................................ 379/16 |
| 5,488,655 | 1/1996 | Hamlen ..................................... 379/114 |
| 5,553,127 | 9/1996 | Norell ....................................... 379/207 |
| 5,583,928 | 12/1996 | Tester et al. .............................. 379/220 |
| 5,699,402 | 12/1997 | Bauer et al. ............................... 379/26 |

FOREIGN PATENT DOCUMENTS

| | | |
|---|---|---|
| 2348612 | 11/1977 | France . |
| 27 43 235 | 4/1979 | Germany . |

OTHER PUBLICATIONS

GR–512–CORE, Issue 1, Jan. 1995, SSGR: Reliability, Section 12, Outage Reporting and Analysis, pp. 7–1 through 9–6.

Primary Examiner—Curtis A. Kuntz
Assistant Examiner—Binh K. Tieu
Attorney, Agent, or Firm—Nixon & Vanderhye P.C.

[57] ABSTRACT

In a telecommunications system, the amount of time a subscriber device is effectively out of service as a result of some fault or failure in telecommunications equipment is monitored. Subscriber devices are connected by corresponding subscriber communication paths to receive information from or transmit information to a telecommunications center such as a local telephone exchange. One or more data records is maintained in computer memory for each subscriber path connected to the communications center. Each data record is updated using recently determined data relating to the operational status of each subscriber path. The computer then determines from the updated record in accordance with one or more subscriber line blocking criteria a subscriber path blocking parameter. The subscriber path blocking parameter may represent for example an average amount of time each subscriber path satisfies the one or more subscriber line blocking criteria.

39 Claims, 7 Drawing Sheets

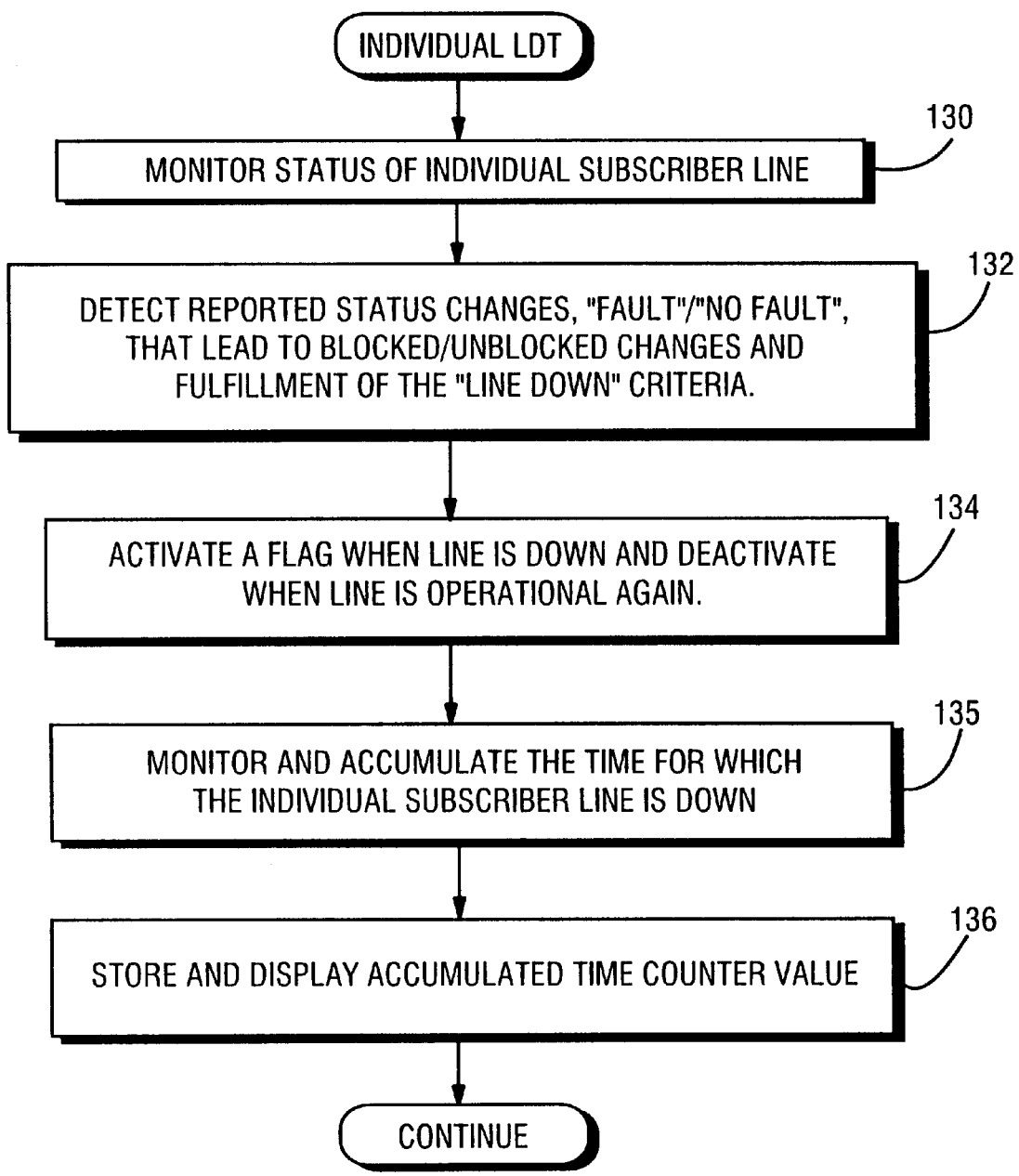

METHOD AND APPARATUS FOR MONITORING THE OPERATION OF TELECOMMUNICATIONS EQUIPMENT

FIELD OF THE INVENTION

The present invention relates to monitoring the operation of telecommunications equipment, and more particularly, to monitoring the average amount of time a subscriber is out of service as the result of some fault or failure in the telecommunications equipment.

BACKGROUND AND SUMMARY OF THE INVENTION

It is important to be able to measure and evaluate the performance of a telecommunications system both generally from the overall system perspective and in more detail from the perspective of specific telecommunications equipment. The present invention is particularly directed to the issue of determining how often a telecommunications path, used by a subscriber to request and receive a telecommunications service from a telecommunications system, is "down" as a result of some type of fault or failure in the subscriber path or in the communications system itself. One example of a subscriber path is a wireline which connects a subscriber device such as a telephone to a local telephone exchange. Since a subscriber wireline is perhaps the simplest and most common example of a subscriber path, it is used in the subsequent description for purposes of illustration but not limitation.

One way to address this issue might be to manually sample the status of the subscriber lines, collect and correlate the manually obtained data, and then calculate various statistical parameters based on those collected figures. But a manual approach is tedious, time consuming, expensive, and not altogether effective because of these limitations. Another approach might be simply to measure the amount of time that a telecommunications center such as a local exchange, is down or "out-of-order" and use that as a general measure of how often subscriber lines are down. However, this latter approach is too general and does not account for fault or other blocking events that effect the operational status of the subscriber lines independent of the telecommunications center operation/operability.

It is therefore an object of the present invention to provide a technique that automatically monitors the operational status of individual subscriber lines to determine how often a subscriber line on average and/or individually is blocked or down so that it cannot be used by a subscriber device to receive or request communication services.

It is a further object of the present invention to provide a subscriber line down time monitoring and calculation technique that accounts for causes in subscriber line down time attributable to multiple sources including subscriber line hardware, software specifically controlling the subscriber line hardware, and other external sources including any widespread system down time of the telecommunications center to which the subscriber line is connected.

It is a further object of the present invention to provide such measurement and calculation parameters simply, inexpensively, and with little data processing overhead using existing resources in conventional telecommunications systems.

The method of the present invention monitors the operation of communications equipment including plural subscriber communications paths used by corresponding subscriber devices to receive information from or transmit information to a telecommunications center such as a local telephone exchange. One or more data records is maintained in computer memory for each subscriber path connected to the communications center. Each data record is updated using recently determined data relating to the operational status of each subscriber path. A computer then determines from the updated records a subscriber path blocking parameter. A blocked subscriber path means that the subscriber path cannot be used as intended as a communications path.

The subscriber path blocking parameter may represent the amount of time that a subscriber path is blocked, such as an average amount of time each subscriber path is blocked, or an amount of time that an individual one of the subscriber paths is blocked. The average amount of blocked time per subscriber line for a particular time period is sometimes referred to as line down time (LDT) if the blocking fulfills certain "line down" criteria. It should be understood, however, that the "line down" time calculation also applies to more sophisticated subscriber paths that might also include for example a time division multiplexed time slot. Even if a subscriber path is blocked, it may not be treated as "down" or "operational" unless it satisfies one or more predetermined "line down" criteria. One example criterion is an amount of time that a subscriber path must be blocked (faulty) or unblocked (in operation), e.g., 30 seconds, before that subscriber path will be treated as "down" or "operational," respectively.

Another advantageous feature of the present invention is that the communications center itself, such as the local telephone exchange, is monitored to determine the amount of time (if any) that it is not providing service to the subscriber devices. The system's operational status is monitored in addition to the operational status of the subscriber paths which connect the subscriber devices to the communications system. The amount of time that the subscriber paths are detected as "down" for any reason is calculated based both on the detected operational status of each individual subscriber path and on the determined amount of time that the communications system is not operational.

In a particular embodiment of the present invention that includes a telecommunications center including a switching node, telecommunications subscriber devices, and subscriber lines used by corresponding ones of the subscriber devices to obtain a communications service from the telecommunications center, electronic circuitry detects and reports faults related to each subscriber line. Reported faults are used to determine if the subscriber line should be blocked. The subscriber line blocking state (operational status) is used to determine if the subscriber line is "down" or "operational" according to the line down criteria. A data processor evaluates whether any subscriber line has recently been blocked and whether any subscriber line has recently become unblocked. Subscriber line records stored in memory are updated based on the detected operational status for each subscriber line.

A line interface circuit is connected between a corresponding subscriber line and the telecommunications center. Each line interface circuit includes circuitry that monitors faults of the corresponding subscriber line which could affect whether the corresponding line is blocked. Such line interface circuits may be located at the telecommunications center or at an intervening access node.

In a preferred example embodiment, a plurality of counters may be used in performing line down time calculations. A first counter counts a number of subscriber lines currently detected as down based on the detected operational (blocking) status of the subscriber lines. A second counter accumulates an accumulated number of lines down using periodically obtained values from the first counter. The data processor calculates an average amount of time each subscriber line is down using a value obtained from the second counter and a total number of fully-connected subscriber lines. A fully-connected subscriber line is a line which has been assigned to provide service to a particular subscriber device and has been connected and/or activated so that it is capable of providing that service. The fact that a subscriber line is fully-connected or otherwise activated does not mean that it is necessarily operational or non-operational. A third counter counts a number of currently fully-connected subscriber lines. A fourth counter maintains an accumulated number of fully-connected subscriber lines using periodically obtained values from the third counter.

By using software variables and counters, the preferred example embodiment of the present invention provides a comprehensive and detailed measurement of subscriber line down time useful in evaluating performance. The features and advantages of the present invention will be described in further detail below in conjunction with the drawings.

BRIEF DESCRIPTION OF THE DRAWINGS

FIGS. 5–7 are flowchart diagrams that illustrate procedures employed in implementing the preferred example embodiment of the present invention.

DETAILED DESCRIPTION OF INVENTION

In the following description, for purposes of explanation and not limitation, specific details are set forth, such as particular circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

Figure 1:
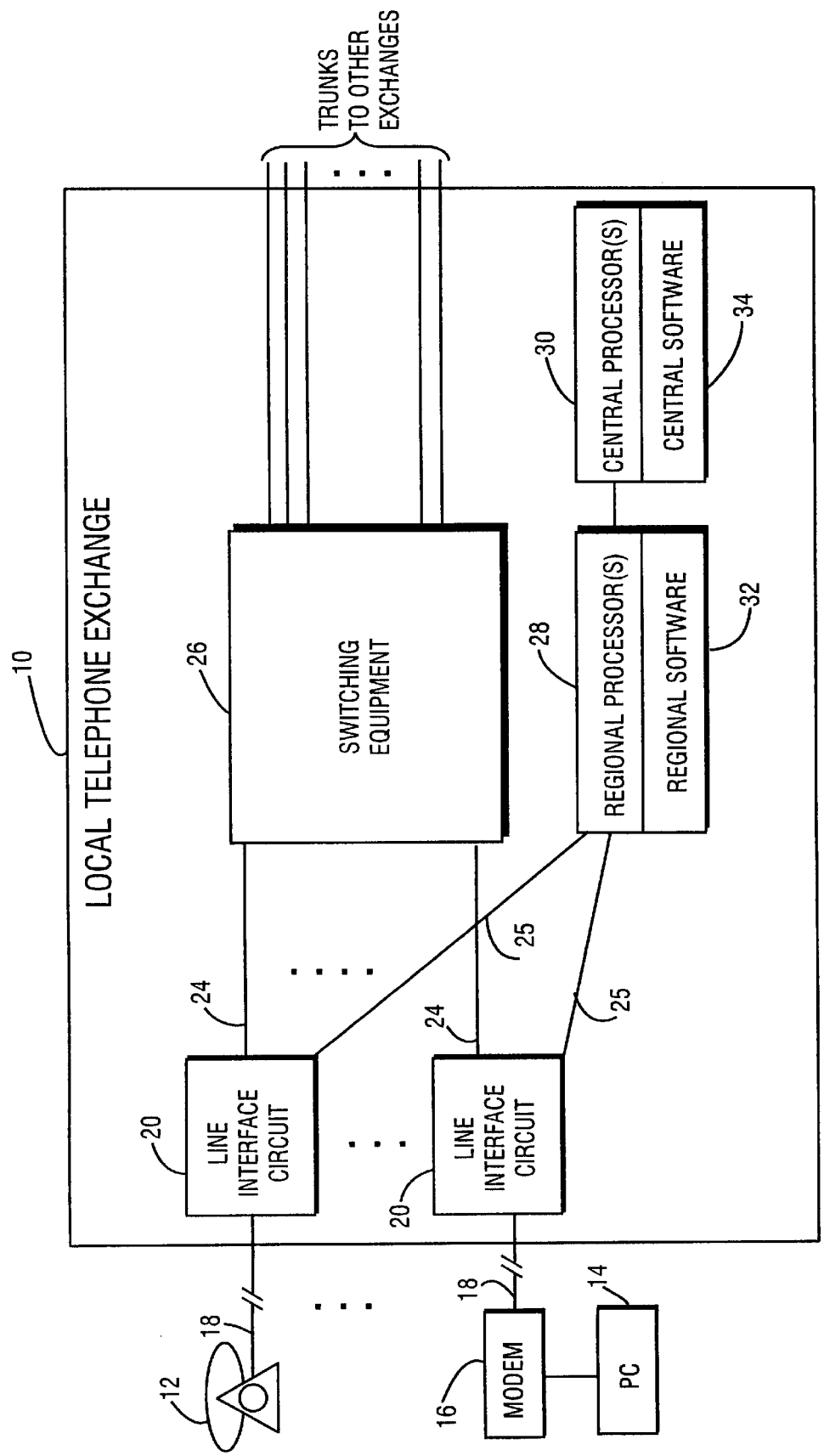
FIG. 1 is a function block diagram showing one example application of the present invention using one or more PSTN line connections to a local exchange.

FIG. 1 illustrates one example application of the present invention. More specifically, a local telephone exchange 10 is shown connected to two subscriber devices 12 and 14 over corresponding subscriber path 18. One example subscriber device is a telephone 12 connected directly by a subscriber wireline to a corresponding line interface circuit (LIC) 20 shown in this example in local telephone exchange 10. Another example type of subscriber device is personal computer 14 connected via modem 16 over subscriber line 18 to corresponding line interface circuit 20 in the local telephone exchange 10. Of course, other types of subscriber wirelines could be used including for example an integrated services digital network (ISDN). While the detailed description is couched in terms of dedicated subscriber wirelines, the present invention is equally applicable to other subscriber paths including shared wirelines, time division multiplexed timeslots, wireless communications channels, etc.

Substantive information from the subscriber devices 12 and 14 such as voice information is communicated via exchange lines 24. Each line interface circuit (LIC) 20 detects faults and reports detected faults to one or more regional processors 28 via connections 25. Each LIC 20 may optionally include a device processor. Regional processors 28 operate in accordance with regional software 32 stored in regional processor memory. Faults reported from the LIC 20 or from software test programs are used by the regional and/or central software 32 and 34 to determine if the subscriber line should be blocked. The blocking state (operational status) is used to determine if the subscriber line is "down" or "operational" according to the line down criteria. In addition, regional processors 28 communicate with one or more central processors 30 operating in accordance with central software 34 stored in central processor memory. In addition to monitoring and controlling information from the respective line interface circuits 20, the processors 28 and 30 also operate and control conventional switching equipment 26 which is typically connected by telephone trunks to other telephone exchanges. While regional and central processors have been shown, those skilled in the art will appreciate that other data processing architectures including a single data processor architecture may also be employed.

Each line interface circuit 20 connected to a corresponding subscriber device performs a number of functions such as conversion of any analog signal on the subscriber line into digital form for further processing in switching equipment which in the preferred embodiment is a digital switch such as the AXE-10 manufactured and sold by Ericsson. The line interface circuit 20 also performs a number of other functions including feeding current to the subscriber line, receiving dialed digits in both pulse and tone formats from the subscriber device, sending ring and tone signals to the subscriber device, and carrying out various measurements on the subscriber line and LIC hardware. In particular, hardware/software self-test and self-checking functions are performed. Information including detected faults in the subscriber line and associated subscriber line hardware and software is reported from the line interface circuits (LIC) 20 via regional processor(s) 28 to central processor(s) 30. Faults may also be reported from test programs located in the central processor software 34. The regional and central processor software programs use the fault information to block or unblock subscriber lines. Knowing the operational status of each subscriber line, the processors also know if the subscriber device is prevented from communication with the local exchange 10.

Figure 2:
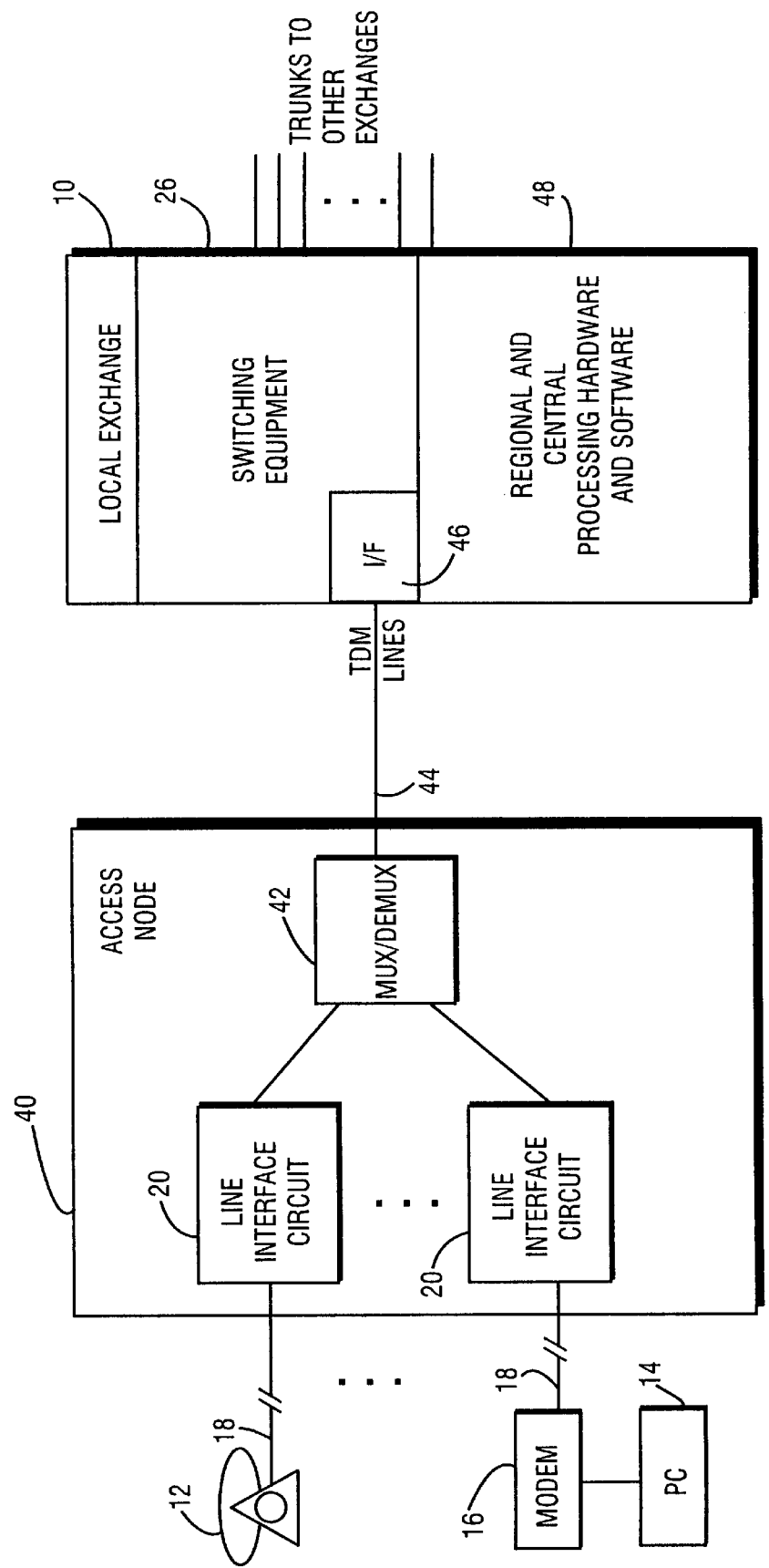
FIG. 2 is a function block diagram showing another example application of the present invention using one or more PSTN connections to a local exchange via a PCM (Pulse Code Modulation) connected Access Node (AN)

Another example application to which the present invention may be applied is illustrated in FIG. 2 where like reference numerals refer to like elements from FIG. 1. An access node 40 is positioned between the subscriber devices 12 and 14 and the local exchange 10. The subscriber wirelines 18 are connected to corresponding line interface circuits 20 in the access node 40. The substantive information (e.g., voice) from the line access node's interface circuits 20 and control-related information from the access node (AN) are multiplexed onto time division multiplex lines 44 by a multiplexer/demultiplexer (MUX/DEMUX) 42 connected to a corresponding interface 46 in switching equipment 26. The blocking information obtained from the access node (AN) is processed by regional and central processing hardware and software 48 as described further below.

In this example application, the subscriber line includes not only the wireline 18 and corresponding line interface circuit 20 but also the multiplexer/demultiplexer (MUX/ DEMUX) 42 and an assigned TDM timeslot(s) on TDM line 44. Thus, depending upon whether individual time slots are assigned to subscriber lines in a static or dynamic fashion, the actual subscriber path corresponding to a subscriber line may vary.

Figure 3:
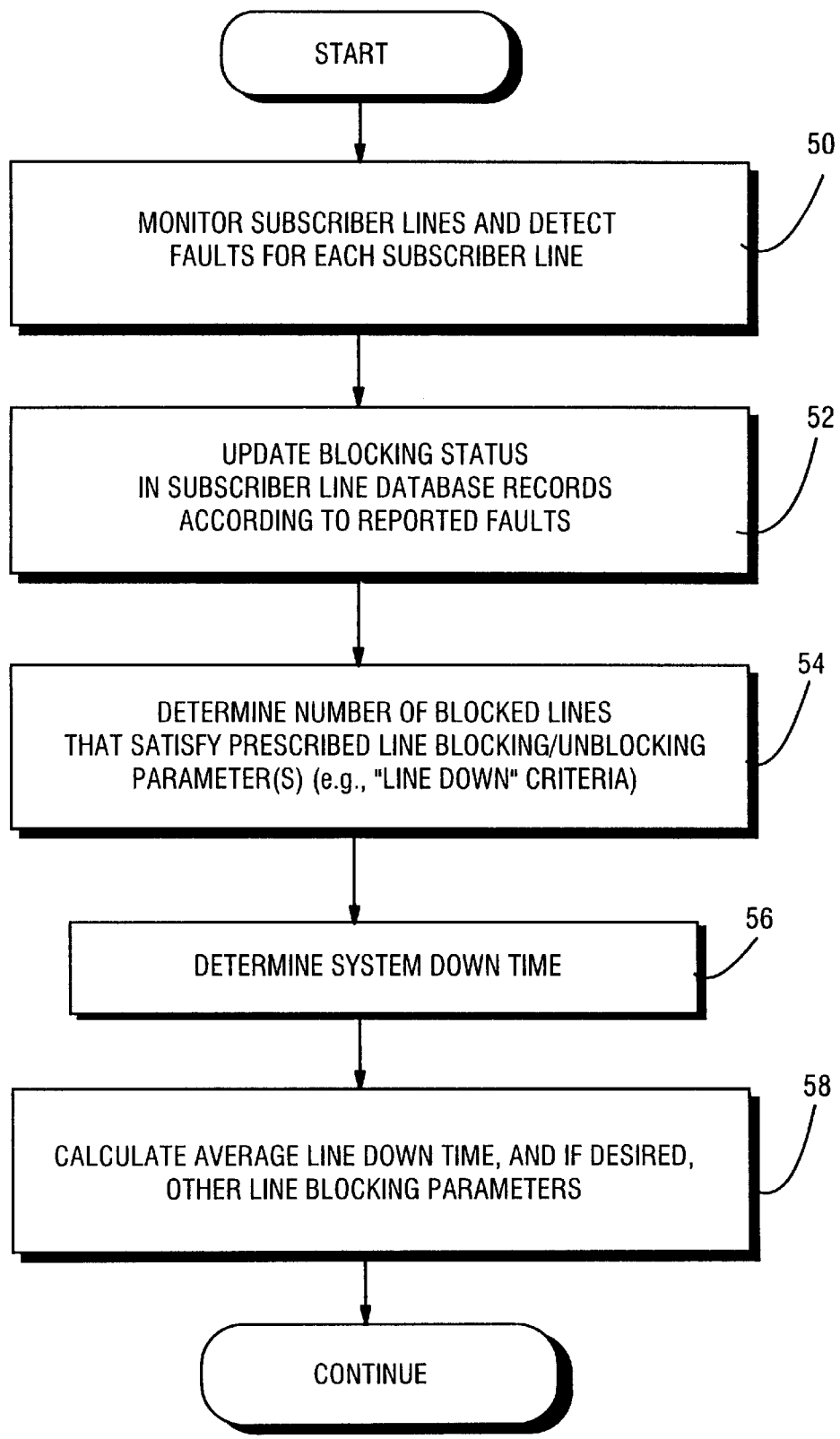
FIG. 3 is a flowchart diagram illustrating a method in accordance with the present invention.

FIG. 3 illustrates a general method in accordance with the present invention executed by one or more data processors already present in the local telephone exchange 10. Subscriber lines are continuously (or periodically) monitored to detect the blocking/unblocking states for each subscriber line. A subscriber line may be blocked for a variety of reasons including a defective subscriber wire, a faulty connection of subscriber wire to either the subscriber device or the line interface, an excessive voltage on the subscriber line 18, a fault in the line interface circuit hardware (e.g., a blown fuse), a fault or other failure in line 24 connecting line interface circuit 20 to switching equipment 26, etc. Other types of software-related blockings are also detected by the telecommunications switch software. Self-test programs may detect faults in hardware and software, and faults may also be detected by the software operating system itself.

The detected and reported fault information of monitored subscriber lines (block 50) is used to update the subscriber line blocking status (operational status) information. For example, blocking status is monitored using individual subscriber line database records (block 52). A determination is made which of the subscriber lines having recently become blocked or unblocked satisfy prescribed line blocking and unblocking parameter(s) including in the preferred embodiment the "line down" criteria (block 54). An example of such a line blocking parameter is the requirement that a line be blocked or unblocked for at least 30 seconds before its operational status ("down" or "operational") is changed.

In block 56, the amount of time that the system (in this example the local telephone exchange 10) is down is determined. The average subscriber line down time, i.e., the time during which the line is blocked and cannot be used for its intended purpose, is then calculated using the system down time and blocking status parameters previously determined (block 58). The average line down time produces an average line down time value attributable to each one of the subscriber lines connected to the telephone exchange as a general performance parameter to evaluate efficiency, reliability, effectiveness, etc. In addition or alternatively, other line blocking parameters may be calculated using the collected subscriber line information including, for example, the amount of time a specific subscriber line (as opposed to an "average" subscriber line) has been blocked.

Figure 4:
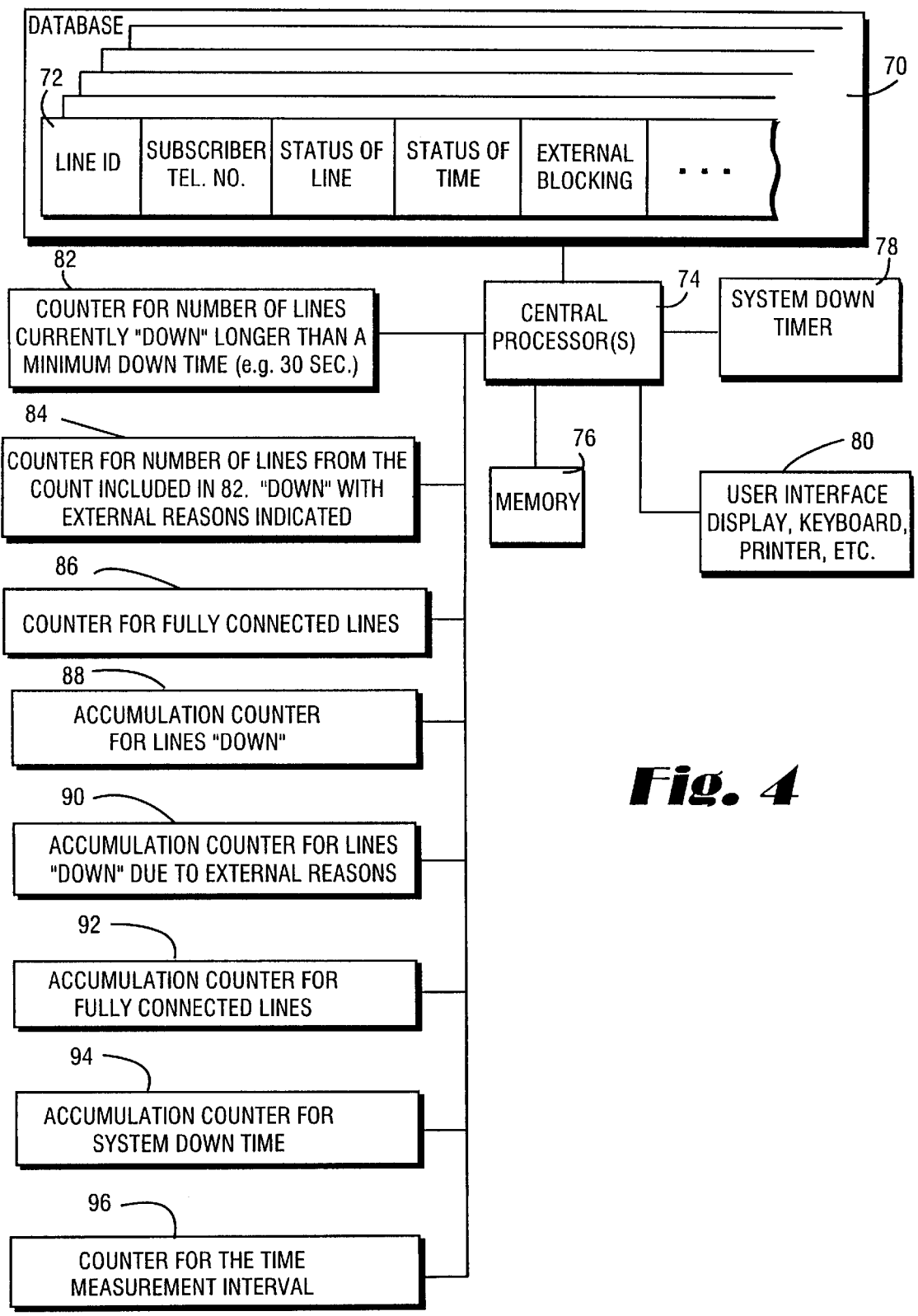
FIG. 4 is a function block diagram showing hardware and software data structures used in implementing the preferred example embodiment of the present invention.

FIG. 4 is a function block diagram of a particular data processing configuration for implementing a preferred example embodiment of the present invention. Specifically, one (or more) central processor(s) 74 is shown connected to a database 70, a system down timer 78, a memory 76 for storing data and program information, a user interface 80 including for example a display, keyboard, printer, etc., and a plurality of counters 82–96. While much of the information obtained by the central processor 74 for calculating line down time is obtained at an application software level, the system down time monitored to in block 56 in FIG. 3 is obtained from the operating system software underlying application software.

Database 70 includes a plurality of subscriber line data records 72. Each record preferably corresponds to one subscriber line. Each subscriber line record 72 includes a line identification field, a subscriber telephone number field, a status of line field, a status time supervision field, an external blocking field, and possibly additional other fields. The central processor 74 creates these database records initially when a new subscriber line is fully-connected or otherwise activated and updates them when a fault or no-fault event is detected on a subscriber line. A subscriber line may be fully-connected or otherwise activated, in the sense that the hardware connections have been made and the central processor has software-activated the line for operation, but nevertheless be blocked operationally as a result of software commands or hardware faults associated with the subscriber line. In an ideal system, all fully-connected/activated lines permit communications between the subscriber devices and the local exchange, and no subscriber lines are down or blocked.

A subscriber line is deemed "fully-connected" when the subscriber line is connected to the subscriber device and the central processor has activated the line by, for example, assigning the subscriber line ID to a subscriber device telephone number or by other software command.

The status of line field stores whether the fully-connected subscriber line is currently blocked or unblocked controlled by subscriber line controlling software. The status time supervision field is in effect a dedicated timer which tracks the amount of time that particular subscriber line has recently been detected as having a blocked or unblocked which fulfills the "line down" criteria. In a preferred example embodiment of the present invention, a software timer is used to detect when a subscriber line has been in a changed blocking/unblocking status for 30 seconds or more.

The external blocking field is an example of other possible fields that may be provided. The external blocking field specifies the cause or source underlying the fault that has caused blocking of a specific subscriber line. In this example, external blocking field permits the central processor 74 to monitor the number of subscriber lines which are blocked for solely reasons which are external or independent of the telephone exchange, e.g., the wire 18 is broken (cut off).

In the example embodiment, the central processor 74 employs counters 82–96 to keep track of the current number of blocked subscriber lines, fully-connected subscriber lines, as well as accumulation total count values. In particular, counter 82 counts the number of lines currently detected as blocked fulfilling the "line down" criteria and having been "down" longer than minimum valid down time, e.g., 30 seconds. Counter 82 is incremented by the central processor 74 when a fully-connected subscriber line is detected as "down" for more than the prescribed blocking time, e.g., 30 seconds. Conversely, the central processor 74 decrements counter 82 each time a fully-connected blocked line is detected as unblocked for more the prescribed time period. Counter 84 keeps track of the number of lines currently externally blocked and fulfilling the "line down" criteria, and therefore monitors a subset of the total number of currently blocked lines maintained in counter 82. The count value in counter 84 is based not only on the status of line and status time fields of the individual subscriber line records but also upon the external blocking field. Counter 86 counts the number of fully-connected subscriber lines.

An accumulation counter 88 is updated on a regular basis, e.g., every 30 seconds, with the current value in counter 82. Similarly, accumulation counter 90 keeps an accumulated count of externally blocked lines based on regular scannings of counter 84. Accumulation counter 92 keeps an accumulated count of fully-connected lines based on regular scannings of counter 86.

The central processor 74 determines line down time (LDT) and other subscriber line performance parameters by scanning the counter values at the end of a performance measurement in accordance with the following equation:

$$\text{LDT(line down)} = \frac{\text{accumulated number of down lines}}{\text{accumulated number of fully-connected lines}} * k \quad (1)$$

The line down time caused by any system down time (SDT), e.g., time during which the local exchange is not operational, is calculated using values from 94 and 96 in accordance with the following equation:

$$\text{LDT(SDT)} = \frac{\text{accumulated system down time}}{\text{measurement time period}} * k \quad (2)$$

In both equation (1) and (2), k is a constant associated with a measurement time period. The total line down time value then is simply calculated in accordance with the following equation:

$$LDT(\text{total}) = LDT(\text{line down}) + LDT(SDT) \quad (3)$$

In addition, the line down time due to blockings of a specific type such as externally blocked timings, may also be calculated using values from 90 and 92 in accordance with the following:

$$\text{LDT(external reasons)} = \quad (4)$$

$$\frac{\text{accumulated count of lines down due to external reasons}}{\text{accumulated count of fully-connected lines}} * k$$

The following is a simplified example that illustrates this LDT calculation:

| Scanning Period | No. of Lines Down | Accumulated No. of Lines Down | No. of Fully-Connected Lines | Accumulated No. of Fully-Connected Lines |
|---|---|---|---|---|
| 1 | 10 | 10 | 10000 | 10000 |
| 2 | 10 | 20 | 10000 | 20000 |
| 3 | 10 | 30 | 10000 | 30000 |
| 4 | 10 | 40 | 10000 | 40000 |
| 5 | 10 | 50 | 10000 | 50000 |
| 6 | 20 | 70 | 10000 | 60000 |
| 7 | 20 | 90 | 10000 | 70000 |
| 8 | 20 | 110 | 10000 | 80000 |
| 9 | 20 | 130 | 10000 | 90000 |
| 10 | 20 | 150 | 10000 | 100000 |

$$LDT = \frac{150}{100000} * 525{,}600 = 788 \text{ minutes down per line per year} \quad (5)$$

In the above example, there are ten scanning periods. The measurement period constant k corresponds in this example to 525,600 minutes which is the number of minutes in a single year. In scanning periods 1–5, the number of lines down is constant at 10, and therefore, 10 lines are added to the accumulated number of lines down in column 2. Similarly, column 3 shows that the number of fully-connected lines in all scanning periods 1–10 is constant at 10,000 so that the accumulated number of fully-connected lines increments each scanning period by 10,000. However, in scanning period 6, the number of lines down increases from 10 to 20 so that the accumulated number of lines down at the end of each scanning period 6–10 increases by 20 rather than 10.

To calculate the line down time for this example, the accumulated number of lines down at the end of scanning period 10, (i.e., 150), is divided by the accumulated number of fully-connected lines at the end of the tenth scanning period, (i.e., 100,000). Multiplying that quotient by the measurement time constant of 525,600 minutes results in an average LDT of 788 minutes during which the average subscriber line was down for one year.

Figure 5:
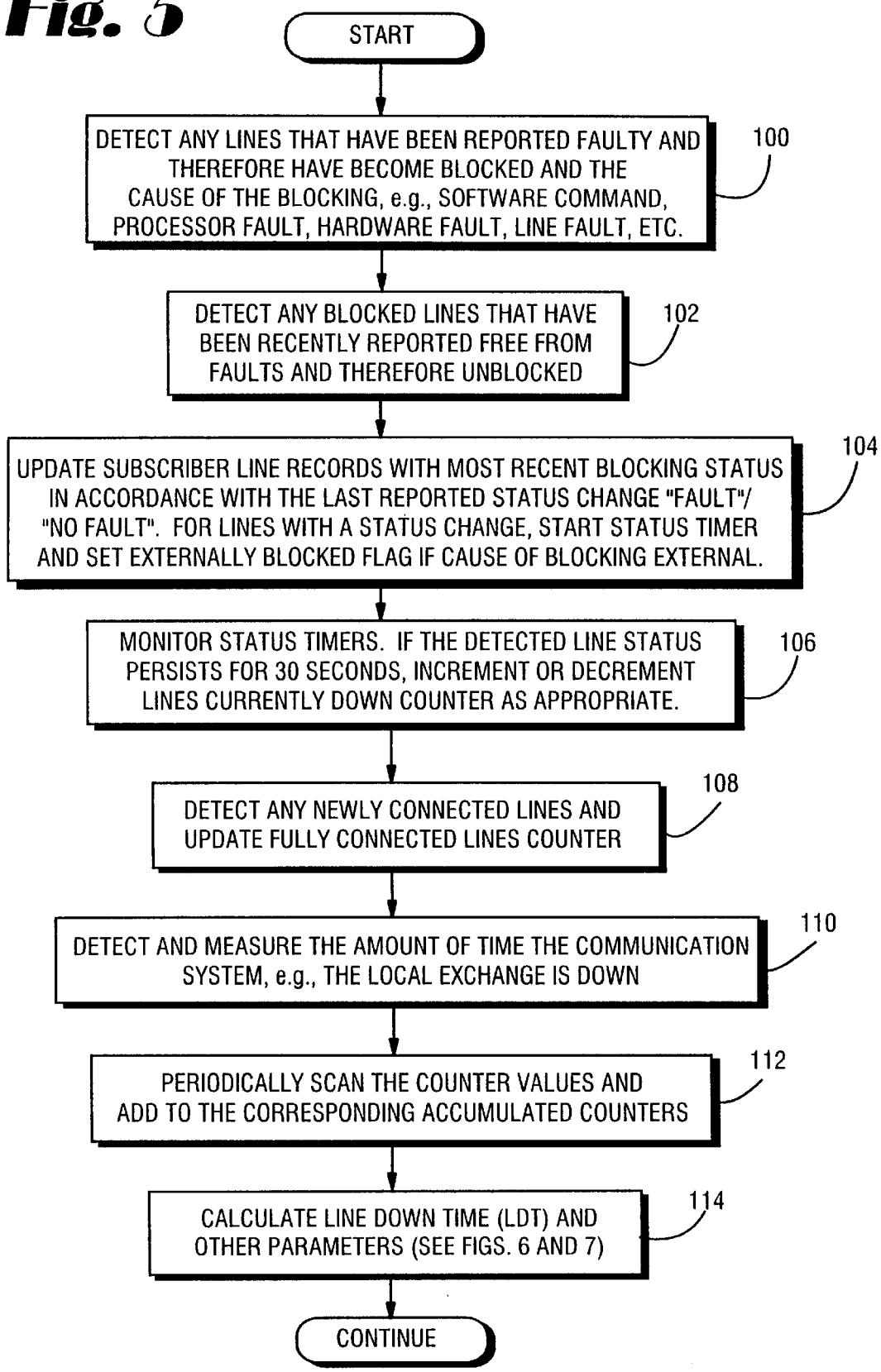
Figure 6:
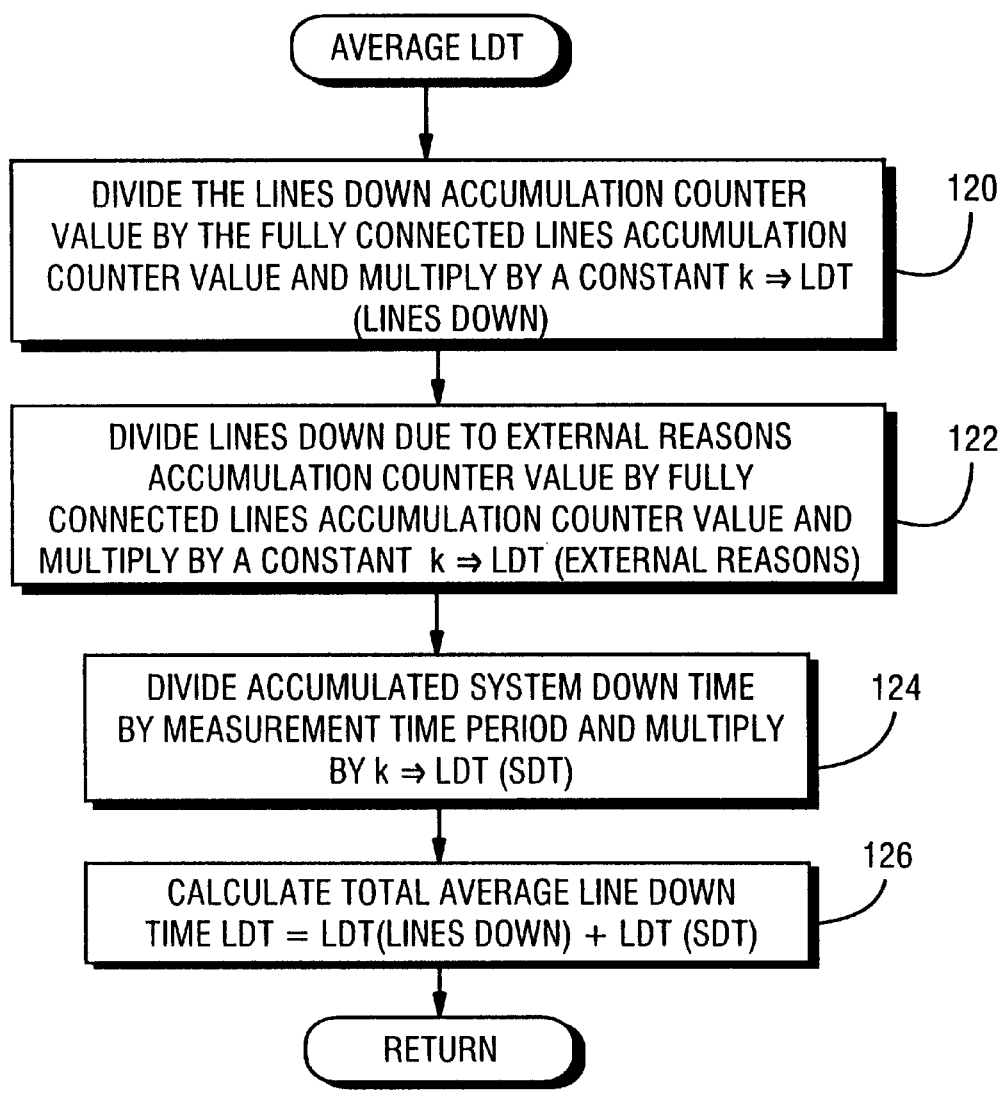

A method for implementing the preferred example embodiment is described in conjunction with the flowcharts shown in FIGS. 5–7. In block 100, any subscriber lines recently reported faulty and therefore blocked as a result of a software command, processor fault, hardware fault, line fault, external voltage, etc. is detected, and preferably, the cause of that blocking is detected as well. Similarly, in block 102, any subscriber lines recently reported free from faults and therefore unblocked are also detected. Subscriber line data records are updated with the most recent status of blocking information in accordance to the last reported fault status change "fault"/"no fault" (block 104).

For subscriber lines whose operational status (down/operational) has changed, a status timer corresponding to that subscriber line is initiated. Moreover, if the cause of the subscriber line blocking was detected as an external cause, a flag in the externally blocked field of the subscriber line data record is set (block 104). The status timers are monitored, and if the detected subscriber line status persists for 30 seconds, the number of subscriber lines currently blocked, and fulfilling the "line down" criteria, stored in counter 82 is incremented for lines which have just become blocked or decremented for lines which have just become unblocked (block 106).

Any new, fully-connected or activated lines, as indicated for example by a software connection command, are detected and used to update the value of the fully-connected lines counter 86 (block 108). From the system down timer 78, the amount of any system down time which corresponds to any amount of time that the local telephone exchange is down, (e.g., not performing services to subscribers), is measured and added to the accumulation counter 94 after each system down event (block 110). The system downtimer 78 is located externally from the central processor and measures the time duration of any outage of the central processor. System downtime may be either reported to or fetched by the central processor at a successful start, restart, or reload of the central processor.

The values of counters 82, 84, and 86 are periodically scanned and added to corresponding accumulation counters 88, 90, and 92 (block 112). Using the accumulation counter values, average line down time and other related parameters are calculated (block 114). This process continues as long as performance of the system is to be monitored.

FIG. 6 shows a flowchart diagram outlining procedures for calculating the average line down time (LDT). The blocked lines accumulation counter 88 value is divided by the fully connected lines accumulation counter 92 value and multiplied by constant k, e.g., 525,600, to generate the parameter LDT (blockings) value as indicated above in conjunction with equation (1) (block 120). The externally blocked lines accumulation counter 90 value is divided by the fully-connected lines accumulation counter value and then multiplied by a constant k to generate the LDT (external blocking) value noted above in accordance with equation (4) (block 122). The accumulated system down time 94 is divided by the corresponding measurement time period 96 and multiplied by the constant to generate to LDT(SDT) as indicated above in equation (2) (block 124). The total average line down time is then calculated in accordance with equation (3), i.e., LDT (total)=LDT (line down)+LDT (SDT), (block 126).

FIG. 7 illustrates in flowchart format procedures for calculating individual line down time. The status of an individual subscriber line is monitored (block 130), and any reported status changes ("fault"/"no fault") that leads to blocked or unblocked changes and fulfillment of the "line down" criteria for that individual subscriber line are detected (block 132). A flag is activated whenever the line is down, and deactivated whenever the subscriber line is operational again (block 134). The flag is regularly scanned and the time for which the individual subscriber line is down is accumulated (block 135). At the end of a desired measurement, the accumulated value counter value may be stored and/or displayed as desired (block 136).

There are several commercial advantages of this invention. Both the operators and developers need an automatic and accurate way of measuring the "in service performance" of the exchange or other communication center. Operators are also able to compare exchanges from different suppliers based on this in service performance. The average line down time is also useful to developers in evaluating the quality of their own telecommunications products.

The foregoing detailed description shows and describes only certain particular embodiments of the present invention. However, those skilled in the art will recognize that many modifications and variations may be made without departing substantially from the spirit and scope of the present invention. Accordingly, it should be clearly understood that the form of the invention herein is exemplary only and is not intended to limit the scope of the invention as defined in the following claims.

What is claimed is:

1. A method for monitoring the operation of communications equipment including a plurality of subscriber communications paths used by corresponding subscriber devices that receive information from or transmit information to a communications system, comprising the steps of:

maintaining a record of an operational status of individual subscriber paths connected to the communications system;

determining the operational state of each subscriber path independent of whether a subscriber call is placed on the subscriber path;

updating each record based on a recently determined operational status of each of the individual subscriber paths; and calculating from the updated record, a subscriber path blocking parameter, where a subscriber path is determined to be blocked based on one or more blocking criteria, including calculating an amount of time that an individual one of the plurality of subscriber paths is blocked.

2. The method in claim 1, wherein the calculating step further includes:

calculating an average subscriber path blocked time.

3. The method in claim 1, wherein at least a portion of the subscriber path is a wire line.

4. The method in claim 1, wherein at least a portion of the subscriber path is a time division multiplexed line.

5. The method in claim 1, wherein the subscriber path includes a line interface circuit.

6. The method in claim 1, the determining step further comprising:

determining a number of blocked paths that satisfies the one or more predetermined blocking criteria.

7. The method in claim 6, wherein the predetermined blocking criteria includes an amount of time a subscriber path, whose operational status has recently changed, has been blocked or unblocked.

8. The method in claim 1, the determining step further comprising:

determining an amount of time the communication system is not providing service to the subscriber devices;

determining a total amount of time that the individual one of the subscriber paths is blocked based on the determined amount of time and on the calculated amount of time the individual subscriber path is blocked.

9. The method in claim 1, the calculating step further comprising:

counting in a first counter a number of subscriber paths currently detected as blocked based on the detected operational status of the subscriber paths and the one or more blocking criteria;

accumulating in a second counter an accumulated number of blocked paths using periodically obtained values from the first counter; and calculating an average amount of time each of the subscriber paths is blocked using a value from the second counter and a total number of activated subscriber paths.

10. The method in claim 9, wherein the total number of fully connected subscriber paths is generated using a third counter for counting a number of currently activated subscriber paths and a fourth counter for accumulating an accumulated number of activated connected subscriber paths using periodically obtained values from the third counter.

11. The method in claim 1, wherein the operational status of each path indicates a source or reason associated with a blocked subscriber path status.

12. The method in claim 1, the calculating step further comprising:

sensing when the individual subscriber path is blocked for more than a predetermined time period, and incrementing a line down counter.

13. A method for monitoring the operation of communications equipment including a plurality of subscriber lines used by corresponding subscriber devices to obtain a communications service from a telecommunications center including a switching node, comprising the steps of:

detecting an operational status of individual subscriber lines including whether any of the individual subscriber lines is recently blocked, where a blocked subscriber line prevents the corresponding subscriber device from obtaining the communications service from the telecommunications center, and whether any of the individual subscriber lines is recently unblocked;

updating one or more subscriber line records based on the detected operational status for each of the individual subscriber lines; and calculating a subscriber line downtime parameter including calculating an amount of time that an individual one of the subscriber lines is down based on the one or more subscriber line records and one or more subscriber line down criteria, wherein the method is performed regardless of whether a subscriber places a call over one of the subscriber lines.

14. The method in claim 13, the calculating step further comprising:

sensing when the individual subscriber path is blocked for more than a predetermined time period, and incrementing a line down counter.

15. The method in claim 13, further comprising:

detecting any newly activated subscriber lines recently activated to permit a subscriber device to communicate with the telecommunications center, wherein the calculating step uses a number of activated subscriber lines to calculate an amount of time per subscriber line that a subscriber line is blocked.

16. The method in claim 13, wherein the calculating step further includes:

calculating an average amount of time each of the subscriber lines is down.

17. The method in claim 13, wherein at least a portion of the subscriber line is a wire line.

18. The method in claim 13, wherein at least a portion of the subscriber line is a time division multiplexed time slot carried on a wire line.

19. The method in claim 13, the calculating step further comprising:

determining the number of blocked lines that satisfy the one or more subscriber line down criteria.

20. The method in claim 19, wherein the one or more subscriber line down criteria includes an amount of time a subscriber line, whose operational status has recently changed, has been blocked or unblocked.

21. The method in claim 15, the calculating step further comprising:

determining an amount of time the telecommunication center is prevented from providing communications service to the subscriber devices;

determining a total amount of time that the individual subscriber line is down based on the determined amount of time and on the calculated amount of time that the individual subscriber line is down.

22. The method in claim 13, the calculating step further comprising:

counting in a first counter a number of subscriber lines currently detected as down based on the detected operational status of the subscriber lines;

accumulating in a second counter an accumulated number of down lines using periodically obtained values from the first counter; and calculating an average amount of time each of the subscriber lines is down using a value from the second counter and a total number of activated connected subscriber lines.

23. The method in claim 22, wherein the total number of activated subscriber lines is generated using a third counter for counting a number of currently activated subscriber lines and a fourth counter for accumulating an accumulated number of activated subscriber lines using periodically obtained values from the third counter.

24. The method in claim 13, wherein the operational status of each line indicates a source or reason associated with a blocked subscriber line status.

25. An apparatus for monitoring the operation of communications equipment, comprising:

a telecommunications center including a switching node;

telecommunication subscriber devices;

subscriber paths used by corresponding ones of the subscriber devices to obtain a communications service from the telecommunications center;

electronic circuitry detecting an operational status of individual ones of the subscriber paths including whether any of the subscriber paths is recently blocked and whether any subscriber path is recently unblocked, the electronic circuitry including:

a memory storing subscriber path records updated based on the detected operational status for each of the subscriber paths, and a data processor calculating a subscriber path blocking parameter including calculating an amount of time that an individual one of the subscriber paths satisfies the one or more subscriber path blocking criteria using information from the updated subscriber path records and one or more subscriber path blocking criteria.

26. The apparatus in claim 25, further comprising:

a plurality of line interface circuits, each line interface circuit connecting a corresponding subscriber path to the telecommunications center, wherein each line interface circuit includes circuitry monitoring the operational status of the corresponding subscriber path and detecting events that affect whether the corresponding subscriber path is blocked.

27. The apparatus in claim 25, further comprising:

an access node connected to plural subscriber devices by way of corresponding subscriber paths coupling information from the corresponding subscriber paths to the telecommunications center, the access network being connected to the telecommunications center by network lines, wherein the operational status of one or more channels on the network lines assigned either statically or dynamically to a subscriber path are monitored to determine their blocking status.

28. The apparatus in claim 25, wherein the data processor calculates an amount of time that the blocked subscriber paths satisfy the one or more subscriber path blocking criteria.

29. The apparatus in claim 25, wherein the data processor calculates an average amount of time each of the subscriber paths satisfies the one or more subscriber path blocking criteria.

30. The apparatus in claim 25, wherein the data processor calculates an amount of time that an individual one of the subscriber paths satisfies the one or more subscriber path blocking criteria.

31. The apparatus in claim 25, wherein at least a portion of the subscriber path is a wire line.

32. The apparatus in claim 25, wherein at least a portion of the subscriber path is a time division multiplexed time slot carried on a wire line.

33. The apparatus in claim 25, wherein the data processor determines the number of blocked paths that satisfy one or more predetermined blocking criteria.

34. The apparatus in claim 33, wherein the one or more subscriber path blocking criteria includes an amount of time a subscriber path, whose operational status has recently changed, has been blocked or unblocked.

35. The apparatus in claim 25, the data processor determines an amount of time the telecommunication center is prevented from providing service to the subscriber devices, and calculates a total amount of time that the individual one of the subscriber paths is blocked based on the determined amount of time and on the calculated amount of time the individual subscriber path satisfies the one or more subscriber path blocking criteria.

36. The apparatus in claim 25, the electronic circuitry further comprising:
   a first counter counting a number of subscriber paths currently detected as blocked which satisfy the one or more subscriber path blocking criteria based on the detected operational status of the subscriber paths;
   a second counter accumulating an accumulated number of blocked paths which satisfy the one or more subscriber path blocking criteria using periodically obtained values from the first counter,
   wherein the data processor calculates an average amount of time each of the subscriber paths is blocked which satisfy the one or more subscriber path blocking criteria using a value from the second counter and a total number of subscriber paths.

37. The apparatus in claim 36, the electronic circuitry further comprising:
   a third counter counting a number of currently activated subscriber paths; and
   a fourth counter for accumulating an accumulated number of activated subscriber paths using periodically obtained values from the third counter.

38. The apparatus in claim 36, further comprising:
   subscriber path equipment sensing the operational state of the individual subscriber path,
   wherein the electronic circuitry includes:
   a first counter incremented when the individual subscriber path is blocked for more than a predetermined time period as sensed by the subscriber path sensing equipment, and
   a system downtime for determining an amount of time the telecommunications center is down.

39. The apparatus in claim 36, wherein the electronic circuitry determines an amount of time the telecommunications center is prevented from providing communications service to the subscriber devices, and determines a total amount of time that the individual subscriber line is down based on the determined amount of time and on the calculated amount of time that the individual one of the subscriber paths satisfies the one or more subscriber path blocking criteria.

* * * * *